Jan. 27, 1970  R. E. MYER  3,492,563

LINEAR WIDE BAND LEVEL CONTROL MEANS AND METHOD

Filed May 8, 1967  2 Sheets-Sheet 1

INVENTOR
R. E. MYER
BY Walter M. Hill
ATTORNEY

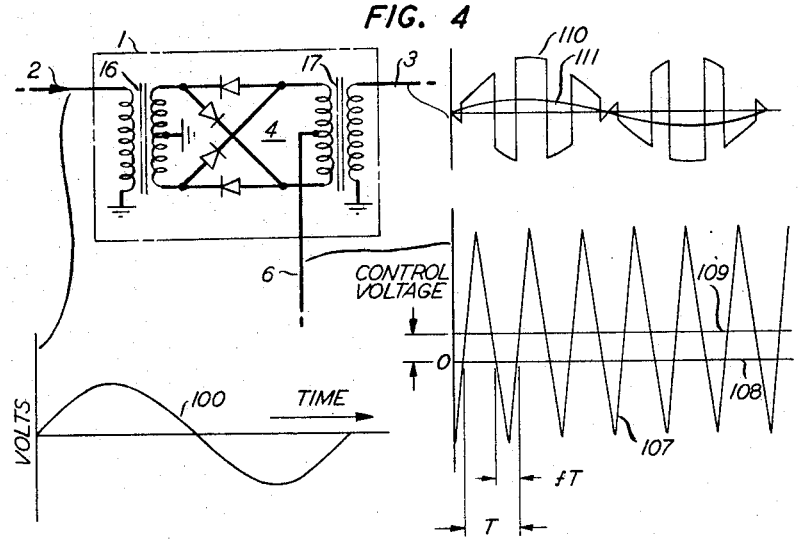
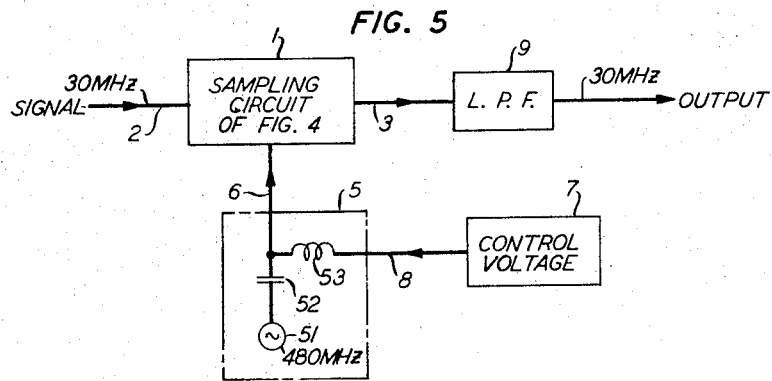
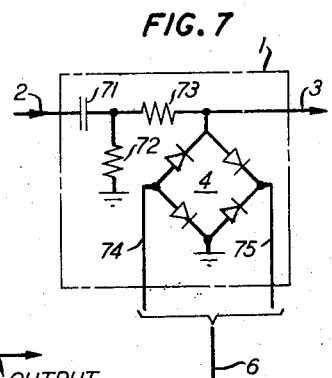
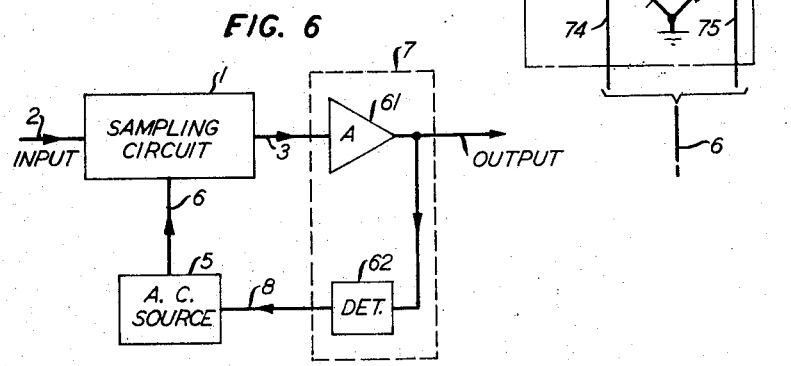

United States Patent Office 3,492,563
Patented Jan. 27, 1970

3,492,563
LINEAR WIDE BAND LEVEL CONTROL MEANS AND METHOD
Robert E. Myer, Denville, N.J., assignor to Bell Telephone Laboratories, Inc., Murray Hill and Berkeley Heights, N.J., a corporation of New York
Filed May 8, 1967, Ser. No. 636,916
Int. Cl. H02p 13/04; H02m 5/12
U.S. Cl. 323—58                              11 Claims

ABSTRACT OF THE DISCLOSURE

A linear wide band level control means and method which samples the signal wave at a rate several times the highest signal frequency. The samples are passed through a filter which rejects the sampling frequency but passes only the signal frequency band. A control voltage varies the duration of the samples relative to the period of the sampling frequency to control the output level from the filter. The output level is a linear function of both the input signal and the control voltage. Response of the output signal to the control voltage is practically instantaneous.

BACKGROUND OF THE INVENTION

This invention relates to the level control of electrical energy.

Many techniques and devices have been developed and used for the control of electric energy. In some cases this control has taken the form of an automatic regulator with an amplifier for controlling the level of a signal wave. A respresentative example of such art is U.S. Patent No. 1,869,331 granted July 26, 1932, to S. Ballantine. Level control has also been applied to systems in which the control is independent of either the input or the output level of the system so that the regulation can be made to conform with other system parameters.

SUMMARY OF THE INVENTION

In accordance with the present invention, a signal is sampled at a rate several times the highest signal frequency to be received. The samples are applied to a filter which passes only the signal frequency band. A control voltage varies the duration of the samples relative to the period of the sampling frequency to control the level of the output from the filter. This output level is a linear function of both the input signal and the control voltage. The control voltage itself may either be derived from the input signal or it may be obtained from some independent source which may be quite arbitrary and totally unrelated to the signal itself. The control of the output signal is practically instantaneous.

BRIEF DESCRIPTION OF THE DRAWINGS

The invention may be better understood by reference to the accompanying drawings, in which:

FIG. 4 discloses a ring modulator used as a sampling circuit;

FIG. 5 illustrates a specific embodiment of an alternating current source combined with a control voltage source and the sampling circuit of FIG. 4 especially suitable for high frequency use;

FIG. 6 is a block diagram illustrating how the invention may be used as an automatic gain control; and FIG. 7 illustrates another specific type of a sampling circuit especially suitable for signals in the audio frequency band.

DETAILED DESCRIPTION

Figure 1:
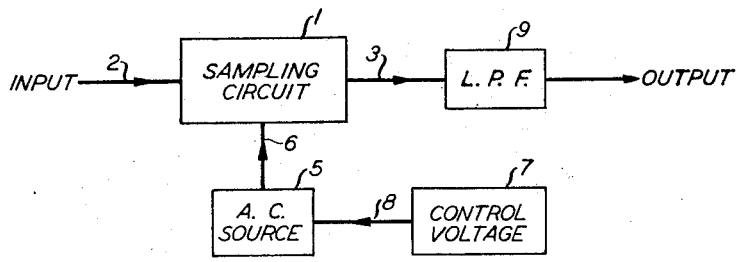
FIG. 1 is a block diagram disclosing the essential elements of the invention.

The block diagram of FIG. 1 shows a sampling circuit 1 which has an input circuit 2, an output circuit 3, and a control voltage channel 6. The control voltage channel 6 connects an alternating current source 5 to the sampling circuit and the control voltage source 7 is connected by way of path 8 to the alternating current source. A low-pass filter 9, capable of passing all significant signal frequencies, is connected to the output circuit 3 of the sampling circuit. The output from the low-pass filter is connected to a utilization means, not shown.

The sampling circuit may be of a variety of forms, some of which are subsequently disclosed. The sampling circuit derives a regular succession of samples from the input signal, each having a controlled duration. The duration of each sample relative to the sampling period is under control of the control voltage source 7. To accomplish this, the voltage from source 7 is added to the alternating voltage obtained from source 5 and applied to the sampling circuit by way of channel 6. Low-pass filter 9 prevents the transmission of energy from alternating current source 5 to the utilization means. This filter must have a characteristic capable of transmitting the entire signal band but must reject frequencies above that band. In cases where the utilization means is inherently unresponsive to the sampling frequency, the filter 9 will be unnecessary.

Figure 2:
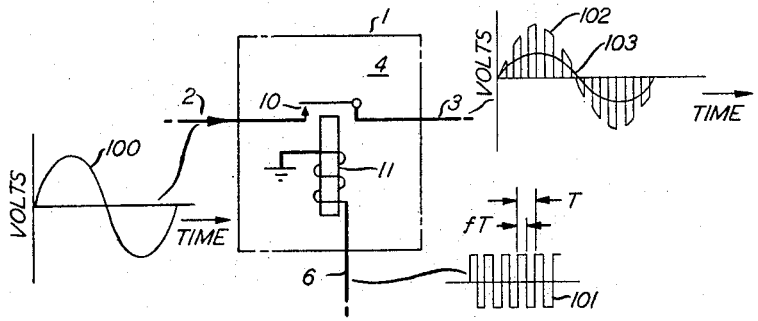
FIGS. 2 and 3 illustrate two simple embodiments of sampling circuits disclosed primarily to illustrate the principles of the invention but neverthless suitable for low frequency use.

To illustrate more specifically the nature and operation of this invention, reference should be made to FIG. 2 in which the sampling circuit is disclosed as including a switching means 4 in the form of a conventional electromagnetic switch. This switch is of the polarized type so that, upon the application of an alternating voltage to its coil 11, its contacts 10 will close only on alternate half cycles. Assume that a sinusoidal signal 100 is applied to input terminal 2 while an alternating voltage 101 of substantially rectangular waveform is applied to the control voltage channel 6. Since the switching device 4 is of the polarized type, its contacts 10 may be made to close only during the excursions of the alternating voltage above its zero axis. Let it now be assumed that the control voltage coming from source 7 can so act on the alternating current source 5 to vary the duration of the positive half cycles of its alternating voltage; that is to say, during each period T of waveform 101, the duration of the positive portion of the waveform will be a fraction of this, namely $fT$, where $f$ may vary from zero to one. It will now be apparent that contacts 10 will close only during the period $fT$. The effect of this operation is to cause the switching means 4 in the sampling circuit to derive from the input signal 100 a series of samples, such as samples 102, which appear at the output circuit 3. It will also be evident that, as the factor $f$ varies, the width of these samples also vary. As shown in FIG. 1, these samples are passed through the low-pass filter 9 from which a signal wave 103 of controlled level is obtained for application to the utilization means. The sample waveform illustrated in FIG. 2 assumes that the factor $f$ is equal to one-half so that the resulting waveform 103 is one-half the amplitude of the incoming wave. As the factor $f$ varies from zero to one the amplitude of the resulting waveform 103 will vary from zero to the maximum value of the input signal wave 100. It will thus be clear that the amplitude of the output waveform 103 is proportional to the product of the amplitude of the incoming waveform and the factor $f$.

Essentially, the same principles described above apply to the sampling circuit shown in FIG. 3. In this case, the switching means 4 is again a polarized electromagnetic device having a coil 15 and a pair of switch contacts 13 and 14 arranged as a single-pole, double-throw switch. These contacts alternately close as the armature of the switching device first closes contact 13 and then closes contact 14, these closures being synchronized with the positive and negative portions of the alternating voltage wave 104 applied to the control voltage channel 6. A transformer 12 has its primary winding connected to the input terminal 2 and the outer terminals of its secondary winding are connected to contacts 13 and 14, respectively, while its center point is grounded. It will be apparent that contacts 13 and 14 will receive samples of the signal wave in opposite phase so that as these contacts alternately close, they produce the positive-going and negative-going portions of the samples as shown for the waveform 105 appearing at output terminal 3. Let it be assumed that the waveform 100 of FIG. 2 is applied to input terminal 2 in FIG. 3 and that the alternating voltage waveform 104 is applied to the control voltage channel 6. Let it also be assumed that the phases at transformer 12 are so selected that as waveform 104 goes into its positive phase contacts 14 are closed and that during the first half cycle of the signal wave, the closure of contacts 14 will produce the narrower positive-going samples of waveform 105 while the closure of contacts 13 will produce the wider negative-going samples of waveform 105. During the second half cycle of the input wave, the phases will reverse at transformer 12 so that the closure of contacts 14 will now produce the narrower negative-going samples while the closure of contacts 13 will produce the wider positive-going samples. Here again, the factor $f$ may vary from zero to one, but in this case it will be evident that when the factor is one-half, the output waveform 106 coming from filter 9 will be of zero amplitude and that as the factor changes from a value less than one-half to a value greater than one-half, waveform 106 will reverse in phase with reference to the input signal wave. The circuit of FIG. 3 shows that, when sampling is accomplished on a full wave basis, both an instantaneous level change and an instantaneous reversal in phase can be accomplished by an instantaneous change in the factor $f$.

Figure 3:
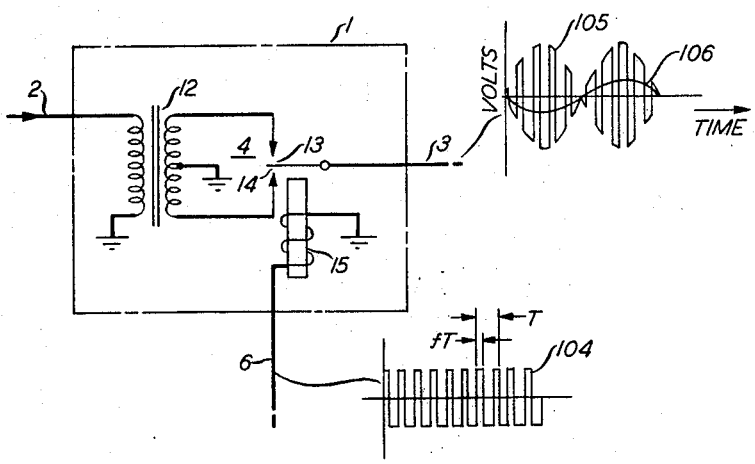

While the sampling circuits shown in FIGS. 2 and 3 are primarily intended to illustrate the principles of the invention, they are nevertheless quite operative for low frequency signals, particularly in the subaudible range. The sampling rate or frequency should be substantially higher than the highest signal frequency to be applied to terminal 2. Moreover, the input signal need not be alternating for the circuit of FIG. 2 as the invention will work equally well with a direct voltage applied to its input terminal 2.

In the circuit arrangement shown in FIG. 4 the sampling circuit 4 is in the form of a ring modulator of conventional construction as more fully described in U.S. Patent No. 2,025,158 granted Dec. 24, 1935 to F. A. Cowan. This type of sampling circuit is particularly useful where high signal frequencies are to be controlled, although it is also quite operative at lower frequencies. Circuits have been constructed with this sampling circuit capable of handling signals up to 30 megaHertz and using a sampling rate in the order of about 500 megaHertz. In operation, the signal wave 100 is applied to input terminal 2 which is coupled to the ring modulator through the input transformer 16. The output signal is derived from transformer 17 and the control voltage is obtained from the control voltage channel 6 connected to the conjugate terminals of the ring modulator in the manner described in the Cowan patent. When using this ring modulator, the alternating current source 5 of FIG. 1 may produce either a sinusoidal or a triangular alternating waveform and its frequency should be substantially higher than the highest frequency to be transmitted but need not be constant. Its amplitude, however, should be stable. While not limited to any particular frequency relationship, an example may be given where the input signal wave 100 could have a frequency as high as 30 megaHertz while waveform 107 may have a frequency of about 500 megaHertz.

In FIG. 4, axis 108 is the zero axis of the alternating voltage wave in switch channel 6 while axis 109 is the zero axis of the triangular waveform 107. When the control voltage from source 7 is zero, axis 109 coincides with axis 108. However, when a control voltage from source 7 is applied to the alternating current source 5, axes 108 and 109 separate by an amount proportional to the magnitude and in a direction determined by the polarity of the control voltage from source 7. For each period T of the alternating current wave 107, a portion of the waveform will appear above the zero axis 108 and the remaining portion will appear below this axis. During the period that the waveform exists above axis 108, one pair of opposite diodes in modulator switching means 4 will be made conductive while the other pair will be reverse biased. During the period that the waveform exists below axis 108, the diode pairs reverse their conductive and non-conductive states. Let it be assumed that the diodes in the parallel paths of switch 4 are forward biased when waveform 107 exists above axis 108 and that the diodes in the diagonal paths will be forward biased during the period that the portion of the waveform exists below axis 108. The time during which the waveform 107 exists below axis 108 will be $fT$. Under these assumptions the diagonal diodes will be conducting during the period $fT$ while the diodes in the parallel paths will be conducting for the remaining portion of the period of waveform 107. The effect is to produce the series of samples shown in waveform 110 at output terminal 3. The output from the filter will be as shown by waveform 111. When factor $f$ is equal to one-half, the amplitude of the output wave 111 will be zero and as factor $f$ becomes greater or less than one-half, waveform 111 will change in amplitude and phase in the same manner as described above for FIG. 3.

FIG. 5 discloses a circuit means for controlling the sampling circuit of FIG. 4 in accordance with this invention. FIG. 5 corresponds in all respects to FIG. 1 except for the specific disclosure in block 5. Block 5 includes an alternating current source 51 which may, for example, have a frequency of 480 megaHertz. The control voltage source 7 produces a direct voltage which may vary both in magnitude and in polarity. Alternating current source 51 is coupled to the control voltage channel 6 through a capacitor 52 which also serves to block the direct voltage from source 7. Control voltage source 7 is connected by way of path 8 through an inductor 53 to the alternating current source 5 where it is superimposed on the alternating voltage from source 51 and applied to the control voltage channel 6. The inductor 53 blocks the energy of source 51 from the control voltage source 7. As has been previously indicated, it is immaterial how the control voltage is obtained in source 7. For the purposes of this invention, it may be assumed that it is under manual control although automatic control is obvious. The operation of the circuit of FIG. 5 agrees in all other respects with the disclosure of FIG. 4.

FIG. 6 is an illustrative example of an automatic gain control in which the control voltage source 7 comprises an amplifier 61 and a detector 62, both of which may be of conventional design. It is assumed that amplifier 61 has a bandpass characteristic capable of rejecting frequencies above the band of interest and, in particular, the frequency of source 5. Moreover, detector 62 may include a threshold circuit providing delayed action of the automatic control in accordance with conventional practice. The output from the sampling circuit is applied over path 3 to the amplifier 61 and the amplified signal from amplifier 61 is detected by detector 62. When the threshold is reached, automatic gain control action begins and a direct voltage from the detector is applied to the alternating current source 5 over path 8, the level being thereafter controlled in the same manner as previously described. It will be evident that, in this case, the output from detector 62 must be unipolar. When this automatic gain control is to be used with an audio amplifier, a simpler form of sampling circuit may be used although the sampling circuit shown in FIG. 4 is quite workable.

FIG. 7 discloses a sampling circuit quite suitable for use in sampling signals in the audio frequency band. This circuit has the properties described for the circuit of FIG. 2. It will be noted that the input terminal 2 is coupled to the output terminal 3 through a capacitor 71 and a resistor 73. The junction between capacitor 71 and resistor 73 is brought to ground through a resistor 72. The switching circuit 4 will be recognized as a conventional type of diode bridge which will ground terminal 3 whenever the diodes are conducting and will permit the transmission of signals to terminal 3 whenever the diodes are nonconducting. When the control voltage applied over channel 6 causes conductor 74 to become positive with reference to conductor 75, the four diodes in the bridge are all rendered conductive. When conductor 75 is made positive with reference to conductor 74, the four diodes are back-biased and, therefore, nonconductive. When the diodes are conductive, they correspond in function to the circuit of FIG. 2 when contacts 10 are open and when the diodes are made nonconductive, they correspond in function when contacts 10 of FIG. 2 are closed. It will be evident that conductors 74 and 75 must be supplied either from an isolated system or one which is balanced with reference to ground.

A variety of sampling circuits have been disclosed to illustrate different forms the invention may take depending upon the signal frequency band to be controlled and the use to which the invention is to be put. Many kinds of sampling gates are known in the art and most any of them can be adapted for use in the practice of this invention. The examples disclosed herein are adquate to suggest to those skilled in the art how these gates may be used. The invention has been found quite useful not only for automatic level control in audio systems, but also for level control in high frequency systems. The operation is highly linear in that the output signal amplitude very closely approaches a linear function of both the input signal level and the control voltage and the phase relationship from the input circuit to the output circuit is essentially constant over most of the control range. The control action has been found very rapid and essentially instantaneous in the band of interest. This makes it possible to use different level controls in a multiplexing system where rapid succession of signals are to be level controlled each in accordance with a different control voltage. The invention also is capable of operating over an extremely wide band from essentially zero to a frequency limited only by the limitations of the devices used. The invention has been found operative with present day devices over bands from essentially zero to about 100 megahertz. Since a broad method is also obviously inherent in the several embodiments used to illustrate the invention, various modification embodying the principles of this invention will become apparent to those skilled in this art and these should be considered within the scope of this invention.

What is claimed is:

1. A fast acting linear wide band level control for an electric signal, said control comprising a sampling circuit having an input circuit for receiving a signal to be controlled and an output circuit for delivering samples of the signal to a utilization means, a switching means in said sampling circuit for deriving from said signal a regular succession of samples having controlled durations, each sample having an amplitude substantially proportional to the instantaneous amplitude of said signal during each sampling period, an alternating current source having a frequency substantially higher than the highest frequency of said signal, means coupling said alternating current source to said sampling circuit to continuously drive said switching means in synchronism with current from said alternating current source, a control voltage source coupled to said alternating current source to control the durations of the samples derived by said switching means, relative to the period of the sampling frequency, and a filtering means connected to the output circuit of said sampling circuit for passing only energy of said signal frequencies.

2. The combination of claim 1 wherein said switching means comprises an electromagnetic switch having contact means connected in the path between the input and output circuits of said sampling circuit and an electromagnet to operate said contact means, said electromagnet being connected to said alternating current source through said coupling means.

3. The combination of claim 2 wherein the contact means of said electromagnetic switch comprises a single pair of contacts.

4. The combination of claim 2 wherein said sampling circuit comprises two pairs of oppositely disposed contacts and an armature arranged to operate as a single-pole, double-throw switch, a transformer having a primary winding and a secondary winding with two outside terminals and a center tap, said primary winding being connected to said input circuit, said contacts being connected to the outside terminals of said secondary winding and said armature being connected to said output circuit.

5. The combination of claim 1 wherein said switching means comprises a ring modulator.

6. The combination of claim 1 wherein said switching means comprises a diode sampling gate connected in circuit between said input circuit and said output circuit.

7. The combination of claim 1 wherein said switching means comprises a diode sampling gate having four diodes connected as a bridge with two opposite terminals of said bridge comprising a pair of switch terminals connected across the transmission path from said input circuit to said output circuit to block transmission of signals when said diodes are made conductive, and a pair of control terminals on said bridge, conjugate with said pair of switch terminals, for connection to said alternating current source to control the conductivity of said diodes.

8. The combination of claim 1 wherein said alternating current source comprises a high frequency generator, said means coupling said alternating current source to said sampling circuit comprises a capacitor and said control voltage source is coupled to said alternating current source through an inductor.

9. The combination of claim 1 wherein said control voltage source comprises an amplifier and a detector, said amplifier being connected to the output circuit of said sampling circuit and including said filtering means, said detector being connected to derive the control voltage from the signal energy passed by said amplifier.

10. A fast acting linear wide band level control for an electric signal, said control comprising a sampling circuit having an input circuit for receiving a signal to be controlled and an output circuit for delivering samples of the signal to a utilization means inherently responsive only to the frequencies of said electric signal, a switching means in said sampling circuit for deriving from said signal a regular succession of samples having controlled durations, each sample having an amplitude substantially proportional to the instantaneous amplitude of said signal during each sampling period, an alternating current source having a frequency substantially higher than the highest frequency of said signal, means coupling said alternating current source to said sampling circuit to continuously drive said switching means in synchronism with current from said alternating current source, and a control voltage source coupled to said alternating current source to control the durations of the samples derived by said switching means relative to the period of the sampling frequency.

11. The method of controlling the level of an electric signal comprising the steps of deriving a rapid and continuous succession of samples from the electric signal to be controlled, each sample having an amplitude substantially proportional to the instantaneous amplitude of said signal during each sampling period, the sampling frequency being substantially higher than the highest frequency of said signal, controlling the duration of the samples relative to the period of the sampling frequency, and extracting from the samples only energy of the signal frequencies.

References Cited

UNITED STATES PATENTS

| | | | |
|---|---|---|---|
| 3,226,630 | 11/1965 | Lampke. | |
| 3,260,924 | 7/1966 | Bridgeman | 323—18 |
| 3,328,674 | 6/1967 | Bleicher | 323—58 X |
| 3,376,490 | 4/1968 | Osugi | 321—9 X |
| 3,409,817 | 11/1968 | Gillett | 321—9 X |

LEE T. HIX, Primary Examiner

G. GOLDBERG, Assistant Examiner

U.S. Cl. X.R.

325—397